(12) United States Patent
Strebl et al.

(10) Patent No.: US 6,775,517 B2
(45) Date of Patent: Aug. 10, 2004

(54) SYNCHRONIZED TEACHING MOBILE

(76) Inventors: Stephan Erich Hills Strebl, 102 Van Tassel Ct., San Anselmo, CA (US) 94960; Caroline Kim Chipman, 8 El Cerrito Ave., San Anselmo, CA (US) 94960

( * ) Notice: Subject to any disclaimer, the term of this patent is extended or adjusted under 35 U.S.C. 154(b) by 0 days.

(21) Appl. No.: 10/074,727

(22) Filed: Feb. 12, 2002

(65) Prior Publication Data

US 2003/0152898 A1 Aug. 14, 2003

(51) Int. Cl.$^7$ ............................................. A63H 33/00
(52) U.S. Cl. .................. 434/309; 434/308; 434/402; 434/365; 446/227; 446/242; 40/455
(58) Field of Search ................................ 434/308, 309, 434/393, 402; 446/227, 242; 40/455

(56) References Cited

U.S. PATENT DOCUMENTS

| | | | | |
|---|---|---|---|---|
| 3,699,704 A | * | 10/1972 | Hakim | 446/227 |
| 4,363,181 A | * | 12/1982 | Hyman et al. | 40/466 |
| 4,640,034 A | * | 2/1987 | Zisholtz | 40/455 |
| 5,803,786 A | * | 9/1998 | McCormick | 446/227 |
| 5,951,360 A | * | 9/1999 | Fearon et al. | 446/227 |
| 5,989,098 A | * | 11/1999 | Reynolds et al. | 446/485 |
| 6,113,455 A | * | 9/2000 | Whelan et al. | 446/227 |
| 6,413,141 B1 | * | 7/2002 | Putney | 446/227 |
| 6,447,362 B2 | * | 9/2002 | Khamphilavong et al. | 446/227 |

OTHER PUBLICATIONS

Baik, US 2002/0094748 A1, Nov. 28, 2001.*

* cited by examiner

*Primary Examiner*—Derris H. Banks
*Assistant Examiner*—Dmitry Suhol
(74) *Attorney, Agent, or Firm*—Risto A. Rinne, Jr.

(57) ABSTRACT

An apparatus for the education and entertainment of infants includes a housing that supports a plurality of objects over a crib or playpen and which rotates the objects in a circle. An audio program includes a recitation of each object when it is disposed proximate an infant disposed in the crib or playpen. Accordingly, the infant learns to associate the speech aspect of the audio presentation with the objects through a pattern of continual visual and synchronized simultaneous audio repetition and reinforcement, thereby optimally learning the names of objects and possibly even contributing to the learning of speech syntax.

8 Claims, 1 Drawing Sheet

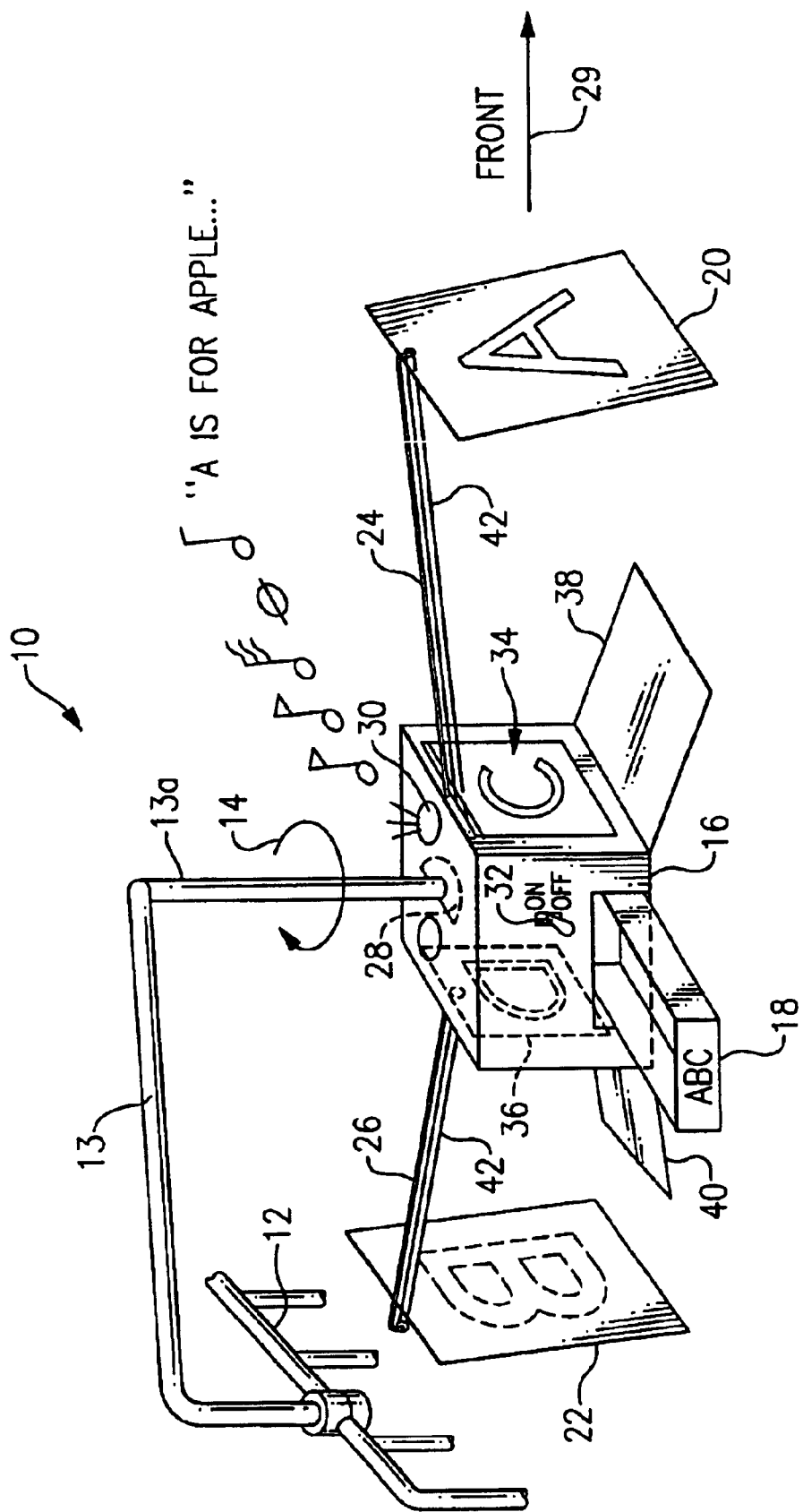

SYNCHRONIZED TEACHING MOBILE

BACKGROUND OF THE INVENTION

1. Field of the Invention

The present invention, in general relates to children's mobiles and, more particularly, to mobiles that rotate and display an object while an accompanying audio program plays music or sings a lullaby.

Children's mobiles are well known types of devices that are typically attached to an infant crib or, alternately, to a playpen. They typically play music while a plurality of objects that are suspended from the mobile rotate in a circle.

Their utility in helping to calm and amuse infants, children, and babies is well known. They often relax the infant and therefore assist in the process of allowing the infant to drift asleep.

Such types of mobiles are used by very young children, infants, and babies who are generally disposed, and therefore confined, in either a crib or a playpen. The use of any of the words children, infant, or baby in this specification is intended to include and encompass all whom might so benefit.

Up until now, mobiles have been used for entertainment and amusement. Their potential as a teaching device has not been fully recognized nor therefore fully utilized. Consider how much time an infant spends in proximity to a mobile. If the mobile had a teaching component as well as entertainment value, the infant could gaze and be amused and, when the infant was more alert and inquisitive, could benefit from the teaching aspect.

Since the mobile is commonly used with infants that have not yet even learned to talk, the music or speech patterns that the infant hears will have little value other than that derived from a soothing melody and the calming effects mentioned hereinabove.

However, if the mobile was consistent in displaying a first object to a child while including some sort of commentary, either in speech or in music, about the first object and then displaying a second object to a child and then commenting about the second object, the child would be provided with a substantial early learning opportunity. As soon as the cognitive faculty of the child to associate the speech (or music) commentary with the object was developed, the child would then be well positioned to make the connection.

Consequently, the child could learn language skills at perhaps the earliest age possible. Another benefit is that since this presentation would also preferably be calming and amusing there is no pressure placed upon the infant to learn anything. Learning (i.e., association) is entirely optional and is accomplished in accordance with the infant's time table. It is not as if an anxious parent were holding flash cards to the new born infant trying to give their child a "high-pressure" academic head-start.

The infant would be exposed to a learning environment that is also calming and entertaining. Whichever benefit the child wanted, or was psychologically ready to receive, is precisely the benefit the child would receive at that moment. The parent would not even have to be present in order for the child to make the transition from entertainment to learning. Whatever benefit is derived is determined solely by the state of the infant at the moment.

Furthermore, if the environment was diverse, if it contained a potentially unlimited landscape of displayed objects along with a diverse and matching commentary, then both the amusement and learning opportunities would be virtually unlimited.

Some infants could learn the names of familiar barn yard animals and then progress to other objects and eventually, possibly, even learn rudimentary speech and syntax, and maybe even the alphabet.

In order for such a mobile to be effective in both the entertainment and learning arenas, it must be synchronized. In other words, it must present to the field of view of the infant a first object while commenting about that object. When the first object passes away from the field of view of the infant and a second object begins to enter the field of view, the commentary must appertain then to the second object.

For this to occur, there must be synchronization between the orientation of the objects of the mobile and the audio program. Once this is attained the opportunity to expand the mobile becomes apparent to those possessing ordinary skill in the art.

Accordingly, there exists today a need for a synchronized teaching mobile that includes an audio program that is synchronized with a display program.

Clearly, such an apparatus would be a useful and desirable device.

2. Description of Prior Art

Mobiles and musical types of mobiles are, in general, known. For example, the following patents describe various types of these devices:

U.S. Pat. No. 6,113,455 to Whelan et al., Sep. 5, 2000;
U.S. Pat. No. 5,971,761 to Tillman, Sr., Oct. 26, 1999;
U.S. Pat. No. 5,951,360 to Fearon et al., Sep. 14, 1999;
U.S. Pat. No. 5,813,861 to Wood, Sep. 29, 1998;
U.S. Pat. No. 5,803,786 to McCormick, Sep. 8, 1998;
U.S. Pat. No. 5,478,268 to Au, Dec. 26, 1995;
U.S. Pat. No. 4,640,034 to Zisholtz, Feb. 3, 1987;
U.S. Pat. No. 4,363,181 to Hyman et al., Dec. 14, 1982;
U.S. Pat. No. 4,207,696 to Hyman et al., Jun. 17, 1980; and
U.S. Pat. No. 3,927,482 to Marcus, Dec. 23, 1975.

While the structural arrangements of the above described devices, at first appearance, have similarities with the present invention, they differ in material respects. These differences, which will be described in more detail hereinafter, are essential for the effective use of the invention and which admit of the advantages that are not available with the prior devices.

In particular U.S. Pat. No. 5,951,360 to Fearon et al., states in column 3, lines 5–7, that it, "rotates the mobile fixtures in response to the music characteristics, thus increasing the entertainment value to the infant". In column 7, lines 20–36 state, in effect, that the motor speeds up, slows down, stops, or reverses direction in response to the musical signal that is being played for entertainment purposes. There is no teaching or suggestion to synchronize the presentation of a display object (i.e., one of the fixtures of the mobile) with an audio output.

However, there are a number of elements such as the use of compact disc, cassette, mounting to cribs and playpens, and the ability to turn itself on or off in response to ambient sounds. These and other changes or modifications may hereinafter be included as part of the instant invention and therefore U.S. Pat. No. 5,951,360 to Fearon et al, is included by reference herein as a part of this specification.

OBJECTS AND SUMMARY OF THE INVENTION

It is an object of the present invention to provide a synchronized teaching mobile that is adapted to entertain an infant.

It is also an important object of the invention to provide a synchronized teaching mobile that is adapted to instruct an infant.

Another object of the invention is to provide a synchronized teaching mobile that is adapted to teach an infant.

Still another object of the invention is to provide a synchronized teaching mobile that is adapted to provide a learning opportunity for an infant.

Still yet another object of the invention is to provide a synchronized teaching mobile that is adapted to present a display object to an infant while simultaneously providing an audible reference to the display object.

Yet another important object of the invention is to provide a synchronized teaching mobile that is adapted to present a first display object proximate to an infant while simultaneously providing an audible reference to the first display object and to then withdraw the first display object from a position that is proximate the infant.

Still yet another important object of the invention is to provide a synchronized teaching mobile that is adapted to present a first display object proximate to an infant while simultaneously providing an audible reference to the first display object and to then withdraw the first display object from a position that is proximate the infant and to then present a second display object proximate to an infant while simultaneously providing an audible reference to the second display object.

Still one further object of the invention is to provide a synchronized teaching mobile that is adapted to present a display object to an infant while simultaneously providing an audible reference to the display object and wherein the audible reference includes either music or singing or both.

Briefly, a synchronized teaching mobile that is constructed in accordance with the principles of the present invention has a housing that is adapted for mounting proximate a crib or playpen. The housing includes a motor that rotates a plurality of display objects that are suspended from the housing. Sensing means are provided to correlate position of the display objects with an audio program presentation so that the audio program includes reference to a first display only when the first display object is proximate to an infant that is disposed in the crib or playpen.

BRIEF DESCRIPTION OF THE DRAWINGS

The FIGURE is a view in perspective of a synchronized teaching mobile.

DETAILED DESCRIPTION OF THE INVENTION

Referring to the FIGURE drawing is shown, a synchronized teaching mobile, identified in general by the reference numeral 10.

A crib 12 (or playpen) wall supports the mobile 10. A first end of a support arm 13 is attached to the crib 12.

The support arm 13 is attached at an opposite end thereof to a first end of a vertical support arm 13a that is disposed in a vertical orientation when the mobile 10 is properly mounted to the crib 12. The vertical support arm 13a is fixed in position and does not move or rotate.

The vertical support arm 13a includes a distal second end that is attached to a housing 16. The housing 16 is adapted to rotate as shown by arrow 14 in a continuous circle around the vertical support arm 13a. If desired, the direction of the arrow 14 could, of course, be reversed (not shown).

The housing 16 includes (not shown) a motor powered by a battery [or other type of power supply]. The motor is operatively attached to the housing or to the vertical support arm 13a so that when the motor is powered, the housing 16 rotates around the vertical support arm 13a. There are numerous ways to accomplish such an arrangement that are well known in the arts.

For example, a possible modification would permit the motor to be disposed in a second housing (not shown) proximate the crib 12 and a flexible cable (not shown) could be conducted through a modified type of support arm 13 and vertical support arm 13a and be used to supply the desired rotary motion to the housing 16.

In any event the housing 16 is adapted to rotate when the mobile 10 is energized.

The housing 16 includes a removable audio program 18 module which includes any known media for storing audio information, such as cassette, compact disc, or digital ROM or RAM.

The audio program 18 includes music, vocals, or speech that make reference to a first object 20 and to a second object 22 (and other objects, as desired) that are being displayed but do so only at the appropriate times, as is described in greater detail hereinafter. The first and second objects 20, 22 are fixtures that are being displayed by the mobile 10 and include an almost infinite variety.

The first object 20 is suspended from a first arm 24 and the second object 22 is suspended from a second arm 26. The housing includes a sensor 28 (dashed lines) which provides information as to its orientation with respect to the vertical support arm 13a.

According to the design of a basic version of the mobile 10, the first object 20 is manually suspended from the first arm 24 and the second object 22 is manually suspended from the second arm 22. The matching audio program 18 for the first and second objects is placed in the housing where it can be played through a speaker 30 when the mobile is energized by a power switch 32.

Let us assume that the first object 20 is the letter "A" and the second object 22 is the letter "B".

A control module (not shown) is disposed in the housing 16 and it includes circuitry sufficient to detect the position of the housing 16 and to coordinate the playing of the audio program 18 as described hereinafter. A microprocessor may be used as a component of the control module.

When the mobile 10 is on, the sensor 28 informs the control module of the position of the housing 16. As shown, the housing 16 is oriented so that the first object 20 is disposed toward the front 29, which would typically be toward an infant (not shown) disposed in the crib 12.

The control module knows that the first object 20 is visible to the infant so it instructs the audio program 18 to play the portion associated with the first object 20. The audio program that corresponds with the first object 20 actually begins playing when the first object just begins to enter the field of view and last for up to as long as the first object 20 remains in the field of view of the infant. With two objects 20, 22, this would include a maximum of 180 degrees of rotation of the housing 16.

In this instance for one-half revolution of the housing 16 when the infant saw the first object 20, namely the letter "A", the infant would also hear "A is for apple" being sung as one possible audio presentation that makes an audible reference to the object being seen, i.e., the first object 20.

The control module determines from the sensor 28 when the first object 20 is no longer visible to the infant and when the second object 22, the letter "B" becomes visible so it then instructs the audio program 18 to play that portion associated with the second object 22. In this instance for one-half revolution of the housing 16 when the infant saw the second object 22, namely the letter "B", the infant would also hear "B is for big" being sung as one possible audio presentation for the second object 22.

Obviously, the physical mounting of the mobile 10 is important in order to ensure that the desired object is visible when that portion of the audio program plays. Various adjustments, such as rotating and locking of the sensor 28, are anticipated to allow correction in this regard for unusual mounting situations.

When the second object 22 ceased to be visible and the first object 20 once again entered the infant's field of view, the audio program 18 would again begin to recite the audio presentation associated with the first object 20. This pattern would repeat as long as the same objects and audio program were being used and the mobile 10 was on.

It should become obvious that the more objects being displayed the more interesting and educational the mobile 10 becomes. There are many possible ways to accomplish this.

Once way is simply by changing the objects. If the parent or care giver wished to display the letters "C" and "D" instead of "A" and "B", the "A" and "B" would be removed, the "C" and "D" would be added, the "C" going where the "A" was and the "D" going were the "B" was and a new audio program (not shown) that was for "C" and "D" would be inserted after the original audio program 18 was removed from the housing 18.

Now when a new first object (the letter "C") appeared, the new audio program might recite, "C is for cat", and then "D is for dog" when appropriate. To further the learning environment, the cards which show the letters could include a picture of an apple for show by the letter "A", a picture of a cat by the letter "C", and so on to optimize association. If cards are not used, then actual plastic molded three-dimensional letters (not shown) could be suspended from the arms 24, 26 as could a three-dimensional apple, cat, dog, or any other desired object.

Of course, the mobile 10 can be modified to include additional switches (not shown) and the audio program 18 can be modified to include additional object recitations (in this case "C" and "D" as well as "A" and "B" in the same audio program). When the parent changed the letters, the additional switches would be adjusted to reflect the new letters. The control module would sense the change in the switch positioning and play the appropriate lyrics for the letters "C" and "D".

While letters are being used for illustrative purposes, it is understood that any range of objects may be so displayed, for example, barn yard animals, plants, flowers, pets, anything at all, providing the audio program 18 included a reference to the object—whatever it may be—when that object was disposed in the field of view, or proximate, the infant.

One simple way to increase the number of objects being displayed is to use more arms (not shown), more objects (not shown) that are attached to each of the additional arms, to slow the rate of turning, and to include additional audio references about the additional objects. In this manner two, three, four or even more objects could be simultaneously displayed and the audio program could recite its program that would include respective references to each of the objects that was played (i.e., recited) when each particular object being mentioned was disposed in a position that was proximate the infant.

A more sophisticated way would be to include additional objects 34, 36 in the housing itself, to add doors 38, 40 to the housing and a pulley arrangement 42 to extend and retract any of the additional objects (either 20 or 34; or 22 or 36) out to the end of the arms 24, 26 and back again respectively. The audio program 18 would recite the appropriate recitation (i.e., melody) at the appropriate time. For example when "A" was displayed proximate the infant, "A is for apple" would play, when "B" was proximate the infant, "B is for big" would play, when "C" was displayed in a position most proximate the infant, "C is for cat" would play, etc. for as many objects as were available for display.

Additional modifications are anticipated. For example, the objects themselves could be modified to inform the housing 16 what they are either a first object 20, second object 22, third object 34, etc. and the corresponding first, second, and third audio recitations would then occur at the appropriate times. Such could occur by coding the objects and then transmitting that code to the control module. The coding could be accomplished in any of a multitude of ways that those possessing ordinary skill in the mechanical and electrical arts would know and be able to incorporate into the mobile 10.

When the child either became bored with any of the objects or when a new learning opportunity was desired, the objects 20, 22 and audio program 18 would be removed and new ones added, thereby providing a virtually endless array of entertainment and learning possibilities.

The invention has been shown, described, and illustrated in substantial detail with reference to the presently preferred embodiment. It will be understood by those skilled in this art that other and further changes and modifications may be made without departing from the spirit and scope of the invention which is defined by the claims appended hereto.

What is claimed is:

1. A synchronized teaching mobile that is adapted for amusing or for teaching an infant, comprising:

(a) a plurality of objects including means for supporting said plurality of objects;

(b) means for presenting a first object of said plurality of objects to a position that is proximate said infant for a predetermined period of time and of then removing said first object from said position that is proximate said infant wherein said means for presenting rotates said object continually and automatically in a circle and wherein said predetermined period of time dose not exceed in magnitude an arc-rotation by said first object when said first object is proximate said infant and wherein said arc-rotation is obtained by dividing 360 degrees of arc by a total number of objects in said plurality of objects; and (c) means for providing an audio program wherein said means for providing an audio program includes providing an audible sound sufficient to be heard by said infant, and wherein said audible sound includes an audible reference that identifies said first object during the time that said first object is disposed proximate said infant and while said first object is disposed within said arc-rotation.

2. The synchronized teaching mobile of claim 1 wherein said plurality of objects includes a plurality of distinct objects and wherein said audible sound includes an audible reference to said first object during the time that said first object is disposed proximate said infant and wherein said audible sound includes an audible reference to another of said plurality of distinct objects when said first object has been removed from said position that is proximate said infant.

3. A synchronized teaching mobile that is adapted for amusing or teaching an infant, comprising:
(a) a plurality of display objects including means for supporting said plurality of display objects;
(b) means for presenting a first of said plurality of display objects to a position that is proximate said infant for a predetermined period of time and of then removing said first of said plurality of display objects from said position that is proximate said infant wherein said means for presenting rotates said plurality of display objects continually and automatically in a circle and wherein said predetermined period of time does not exceed in magnitude an arc-rotation by said first object when said first object is proximate said infant and wherein said arc-rotation is obtained by dividing 360 degrees of arc by a total number of objects in said plurality of display objects;
(c) means for providing an audio program, wherein said means for providing an audio program includes providing an audible sound sufficient to be heard by said infant, and wherein said audible sound includes an audible reference that identifies said first of said plurality of display objects when said first of said plurality of objects is disposed proximate said infant and while said first is disposed within said arc-rotation.

4. The synchronized teaching mobile of claim 3 wherein said means adapted for presenting a first of said plurality of display objects to a position that is proximate said infant for a predetermined period of time includes means adapted for removing said first of said plurality of display objects away from said immediate field of view of said infant.

5. The synchronized teaching mobile of claim 3 wherein said means adapted for presenting a first of said plurality of display objects to a position that is proximate said infant for a predetermined period of time includes means adapted for presenting a second of said plurality of display objects proximate said infant for a predetermined period of time after said first of said plurality of display objects has been removed from said position that is proximate said infant and wherein said means for providing an audio program includes providing an audible sound that includes an audible reference to said second of said plurality of display objects when said second of said plurality of display objects is disposed proximate said infant.

6. The synchronized teaching mobile of claim 3 including a replacement audio program said replacement audio program adapted to produce a pattern of audible sounds that is different from said audible sound, said replacement audio program including said audible sounds encoded on a media, said synchronized teaching mobile including means adapted to reproduce said pattern of audible sounds from said media.

7. The synchronized teaching mobile of claim 6 including a replacement display object and also including means for replacing any of said means for providing an audio program with said replacement audio program and wherein said replacement audio program includes an audible reference that is encoded in a replacement media, said synchronized teaching mobile adapted to reproduce said pattern of audible sounds only when said replacement display object is disposed proximate said infant.

8. A method for providing a synchronized teaching mobile that is adapted for amusing or for teaching an infant, comprising:
(a) providing a plurality of display objects and support for said plurality of display objects;
(b) rotating said plurality of objects continually in a circle to a position in which a first object of said plurality of objects is proximate said infant for a predetermined period of time and then removing said first object from said position that is proximate said infant and wherein said predetermined period of time does not exceed in magnitude an arc-rotation by said first object when said first object is proximate said infant and wherein said arc-rotation is obtained by dividing 360 degrees of arc by a total number of objects in said plurality of objects; and
(c) providing an audio program, wherein said means for providing an audio program includes providing an audible sound sufficient to be heard by said infant and wherein said audible sound includes an audible reference that identifies said first object during the time that said first object is disposed proximate said infant and while said first object is disposed within said arc-rotation.

* * * * *